United States Patent
Namiranian (10) Patent No.: US 10,356,604 B2
(45) Date of Patent: Jul. 16, 2019

(54) ESIM PROFILE REUSE FOR EUICCS

(71) Applicant: T-Mobile USA, Inc., Bellevue, WA (US)

(72) Inventor: Babak Namiranian, Bothell, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 15/816,826

(22) Filed: Nov. 17, 2017

(65) Prior Publication Data

US 2019/0028884 A1  Jan. 24, 2019

Related U.S. Application Data

(60) Provisional application No. 62/535,192, filed on Jul. 20, 2017.

(51) Int. Cl.
 *H04W 4/50* (2018.01)
 *H04W 8/18* (2009.01)
 (Continued)

(52) U.S. Cl.
 CPC ............ *H04W 8/183* (2013.01); *G06Q 30/04* (2013.01); *H04W 4/50* (2018.02); *H04W 8/205* (2013.01)

(58) Field of Classification Search
 CPC ....... H04W 4/50; H04W 8/183; H04W 8/205; G06Q 30/04
 See application file for complete search history.

(56) References Cited

U.S. PATENT DOCUMENTS 9,572,016 B2  2/2017 Cormier et al.
9,705,546 B2  7/2017 Lee et al.
(Continued)

FOREIGN PATENT DOCUMENTS

EP       2858393 A1   4/2015
KR    20130027096 A   3/2013
(Continued)

OTHER PUBLICATIONS

International Search Report and Written Opinion for PCT Application No. PCT/US2018/042181 dated Oct. 29, 2018, 11 pages.
(Continued)

*Primary Examiner* — Said M Elnoubi
(74) *Attorney, Agent, or Firm* — Han Santos, PLLC (57) ABSTRACT

A notification is received from a user device indicating that an embedded subscriber identity module (eSIM) profile is deleted from an embedded universal integrated circuit card (eUICC) of the user device, in which the eUICC has a particular eUICC identifier (ID). The profile state of the eSIM profile is transitioned from a state of in use to a state of suspended. A billing function is then notified that the eSIM profile is deleted from the eUICC of the user device and the suspended state of the eSIM profile. If the billing function determines that the eSIM profile is active for billing a subscriber for telecommunication services, the profile state of the eSIM profile is transitioned from suspended to released for reuse solely by the eUICC with the particular eUICC ID. However, if the billing function determines that the eSIM profile is inactive, the profile state of the eSIM profile is transitioned from suspended to available for use by any eUICC.

20 Claims, 5 Drawing Sheets

(51) Int. Cl.
*G06Q 30/04* (2012.01)
*H04W 8/20* (2009.01)

(56) References Cited

U.S. PATENT DOCUMENTS

| | | |
|---|---|---|
| 9,712,996 B2 | 7/2017 | Park |
| 2010/0311404 A1 | 12/2010 | Shi et al. |
| 2013/0301617 A1 | 11/2013 | Kuhn et al. |
| 2014/0140507 A1 | 5/2014 | Park et al. |
| 2014/0308991 A1 | 10/2014 | Lee et al. |
| 2015/0110035 A1 | 4/2015 | Lee et al. |
| 2015/0305004 A1 | 10/2015 | Ohta et al. |
| 2016/0020802 A1 | 1/2016 | Lee et al. |
| 2016/0094930 A1* | 3/2016 | Ramanna ............ H04W 8/205 455/558 |
| 2016/0119780 A1 | 4/2016 | Jung et al. |
| 2016/0283216 A1 | 9/2016 | Gao |
| 2016/0302070 A1 | 10/2016 | Yang et al. |
| 2016/0316356 A1* | 10/2016 | Li ........................ H04W 8/183 |
| 2017/0048713 A1 | 2/2017 | Guday et al. |
| 2017/0070878 A1* | 3/2017 | Anslot .................... H04W 8/04 |
| 2017/0150356 A1* | 5/2017 | Li ........................ H04W 12/06 |
| 2017/0171742 A1 | 6/2017 | Yang |
| 2018/0014178 A1 | 1/2018 | Baek et al. |
| 2018/0109942 A1 | 4/2018 | Lipovkov |
| 2018/0123803 A1 | 5/2018 | Park et al. |
| 2018/0131699 A1 | 5/2018 | Park et al. |
| 2018/0160294 A1 | 6/2018 | Lee et al. |
| 2018/0176768 A1 | 6/2018 | Baek et al. |
| 2018/0295500 A1* | 10/2018 | Yang .................... H04W 8/183 |

FOREIGN PATENT DOCUMENTS

| | | |
|---|---|---|
| KR | 20140024796 A | 3/2014 |
| KR | 20170007807 A | 1/2017 |
| KR | 20170077489 A | 7/2017 |
| WO | 2014131785 A1 | 9/2014 |
| WO | 2016013827 A1 | 1/2016 |
| WO | 2016091414 A1 | 6/2016 |
| WO | 2016167551 A1 | 10/2016 |

OTHER PUBLICATIONS

International Search Report and Written Opinion for PCT Application No. PCT/US2018/042182 dated Oct. 25, 2018, 9 pages.
International Search Report and Written Opinion for PCT Application No. PCT/US2018/042183 dated Oct. 25, 2018, 10 pages.
International Search Report and Written Opinion for PCT Application No. PCT/US2018/042185 dated Oct. 29, 2018, 10 pages.
Non-Final Office Action for U.S. Appl. No. 15/816,793 dated Oct. 25, 2018, 37 pages.
U.S. Appl. No. 15/816,753, Notice of Allowance, dated Mar. 13, 2019, 35 pages.
U.S. Appl. No. 15/816,793, Final Office Action, dated Mar. 8, 2019, 31 pages.

\* cited by examiner

ESIM PROFILE REUSE FOR EUICCS

CROSS REFERENCE TO RELATED PATENT APPLICATION

This application claims priority to U.S. Provisional Patent Application No. 62/535,192, filed on Jul. 20, 2017, entitled "Subscription Managers," which is hereby incorporated by reference in its entirety.

BACKGROUND

The use of embedded universal integrated circuit cards (eUICCs), also referred to as embedded subscriber identity modules (eSIMs), are becoming increasingly prevalent in consumer and machine-to-machine (M2M) communication fields. Unlike a traditional UICC or SIM card that exists as a removable smart card that is transferrable between multiple device, an eUICC is an integrated circuit that is not designed to be user removable, i.e., it is generally embedded with or soldered to other electronic components of a device.

An eUICC may be provisioned with one or more eSIM profiles, in which each eSIM profile contains a unique international mobile subscriber identity (IMSI) number that authenticates a subscriber to a wireless communication carrier. Other data that are stored in the eSIM profile may include carrier network information, security authentication information, a list of accessible network services, and/or so forth. A wireless communication carrier may transfer an eSIM profile to the eUICC via an over-the-air (OTA) update. In this way, a new subscriber with a user device that is equipped with an eUICC may sign up and receive telecommunication services from a wireless communication carrier without having to obtain a physical SIM card from the wireless communication carrier.

Some user devices are equipped with user interface options for enabling, disabling, or deleting each eSIM profile that is stored on the eUICCs. Accordingly, in some instances, a subscriber may accidentally delete an eSIM profile from an eUICC of a user device. The deletion of the eSIM profile will result in the user device being unable to obtain telecommunication services from a corresponding wireless communication carrier until the wireless communication carrier provisions the eUICC with a new replacement eSIM profile that contains a different IMSI. Furthermore, under current Global System for Mobile Communication Association (GSMA) standards, once an eSIM profile is deleted from an eUICC, the eSIM profile and its associated IMSI are rendered permanently unusable.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques used by a wireless communication carrier to implement the reuse of an eSIM profile that is deleted from an eUICC. An eUICC may be provisioned with one or more eSIM profiles, in which each eSIM profile contains a unique international mobile subscriber identity (IMSI) number that authenticates a subscriber to a wireless communication carrier. In some instances, a subscriber may accidentally delete an eSIM profile from an eUICC of a user device. Under current Global System for Mobile Communication Association (GSMA) standards, once an eSIM profile is deleted from an eUICC, the eSIM profile and its associated IMSI are rendered permanently unusable. Accordingly, in order to provide a subscriber that accidentally deleted an eSIM profile from an eUICC with another eSIM profile, the wireless communication carrier may be obligated to purchase a new eSIM profile with a new IMSI from an eSIM profile vendor. An eSIM profile vendor may be a manufacturer of eUICCs, and thus is able to generate eSIM profiles for installation in the eUICCs. While the cost of each new eSIM profile is relatively low, the aggregate accidental deletions of eSIM profiles by many subscribers over the duration of a year may result in a substantial financial loss for the wireless communication carrier.

In order to implement the reuse of eSIM profiles by a wireless communication carrier, a subscription management service of the wireless communication carrier may be configured to track new types of profile states for eSIM profiles that are deployed on eUICCs of user devices for use by subscribers of the wireless communication carrier. In various embodiments, the subscription management service may receive a notification from a user device of a subscriber that the eSIM profile is deleted from the eUICC of the user device. In turn, the subscription management service may transition a profile state of the eSIM profile from a state of in use to a state of suspended in response to the notification. Subsequently, the subscription management service may contact a billing function of the wireless communication carrier to determine whether the eSIM profile is active or inactive for billing the subscriber for telecommunication services. Accordingly, if the eSIM profile is active for billing the subscriber, the subscription management service may transition the profile state of the eSIM profile to a state of released. The released state means that the eUICC of the user device can be provisioned with another duplicate copy of the same eSIM profile upon request.

However, if the eSIM profile is inactive for billing the subscriber, the subscription management service may transition the profile state of the eSIM profile to a state of available. The state of available means that the eSIM profile is put into a pool of available eSIM profile, and is available for reuse by any eUICC. Accordingly, when the subscription management service receives a request for an eSIM profile from a specific user device with a particular eUICC, the subscription management service may associate the IMSI of the eSIM profile with a subscriber account of the subscriber that is affiliated with the specific user device. In this way, the eSIM profile is bound to the particular eUICC. Subsequently, the subscription management service may send the eSIM profile for storage in the particular eUICC, so that the eSIM profile may be used to authenticate the eUICC to the wireless communication carrier for obtaining telecommunication services.

The reuse of eSIM profiles by a wireless communication carrier may reduce or eliminate the cost and the administrative burden of purchasing new eSIM profiles to replace eSIM profiles that are accidentally deleted from the eUICCs of user devices. Further, eSIM profiles that are deleted from eUICCs in response to legitimate telecommunication service terminations (e.g., ending a service contract with a carrier, porting a user device to another carrier, etc.) may be recycled for reused by other eUICCs. Such reuse may once again provide savings to the wireless communication carrier by reducing the need to purchase new eSIM profiles from eSIM profile venders. Additionally, since the pool of available unassigned IMSIs are not infinite, the reuse of eSIM profiles prevents unnecessary waste of IMSIs due to the permanent deletion of their corresponding eSIM profiles. The techniques described herein may be implemented in a number of ways. Example implementations are provided below with reference to the following FIGS. 1-5.

Example Architecture

Figure 1:
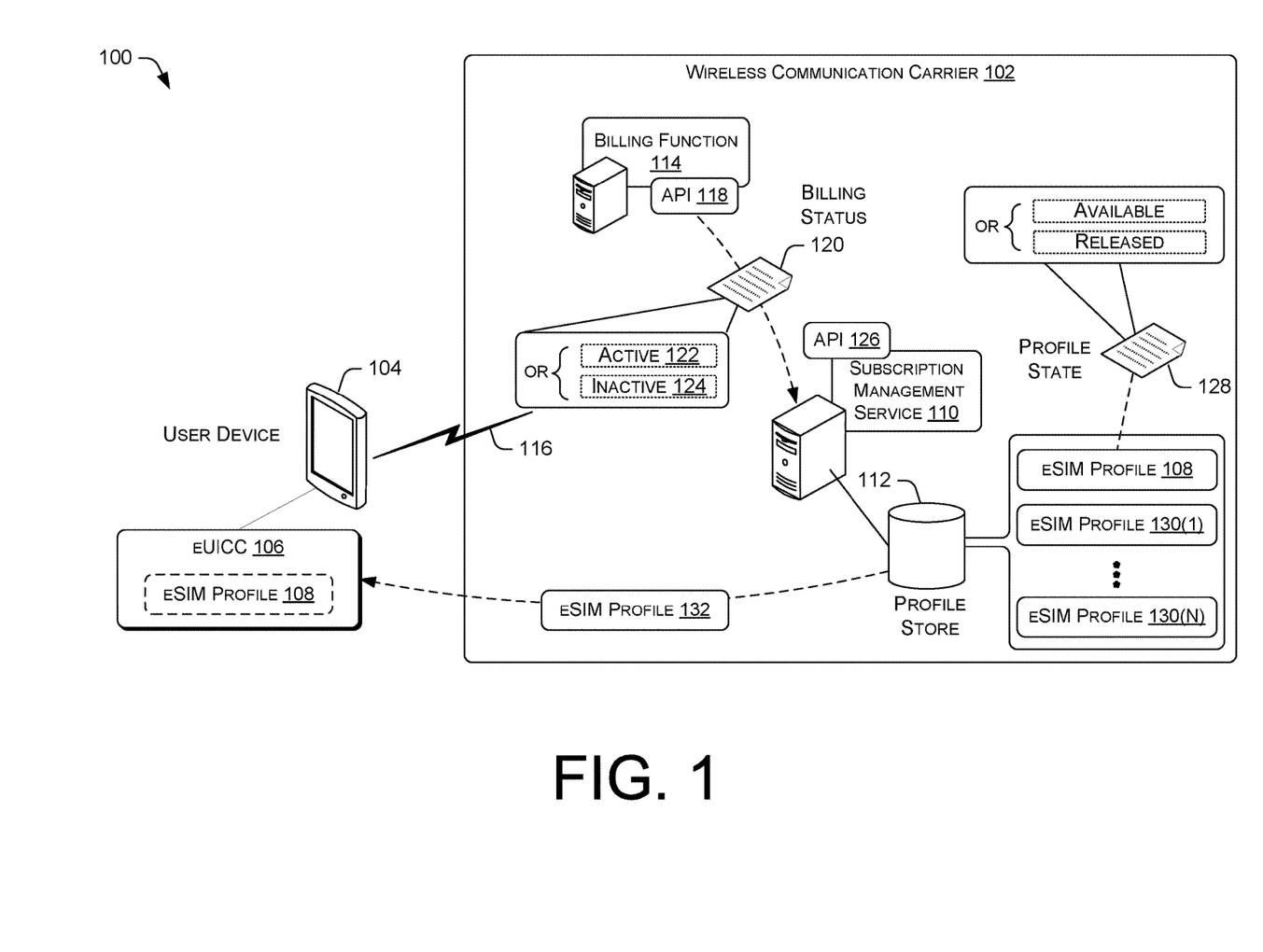
FIG. 1 illustrates an example architecture that enables a wireless communication carrier to implement the reuse of eSIM profiles that are deleted from corresponding eUICCs.

FIG. 1 illustrates an example architecture 100 that enables a wireless communication carrier to implement the reuse of eSIM profiles that are deleted from corresponding eUICCs. The wireless communication carrier 102 may provide a wide range of mobile communication services, as well as ancillary services and features, to subscribers and associated mobile device users. The wireless communication carrier 102 may also be referred to as a mobile network operator (MNO). In various embodiments, the wireless communication carrier 102 may provide wireless communication between multiple user devices. Further, the wireless communication carrier 102 may also provide communications between the multiple user devices and user devices that are serviced by other telecommunications networks. The telecommunication services provided may include voice communication, multimedia communication, data communication, such as email, messaging, content streaming, content uploading, and/or so forth.

The wireless communication carrier 102 may be implemented using multiple interconnected networks. In various embodiments, the wireless communication carrier 102 may include multiple Radio Access Networks (RANs). The RANs may be connected to each other via regional ground networks. In turn, the regional ground networks may be connected to a core network by a wide area network (WAN). Each regional portion of the wireless communication carrier 102 may include one or more RANs and a regional circuit and/or packet switched network and associated signaling network facilities. The wireless communication carrier 102 may provide telecommunication services in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), 5th Generation (5G), and/or so forth. In some embodiments, the core network of the wireless communication carrier 102 may be accessed via wired or wireless local area networks (LANs). For example, a wireless local area network may be a network that is established using Wi-Fi or Bluetooth standards and hardware.

A RAN of the wireless communication carrier 102 may include a number of base stations, also referred as network cells. In some embodiments, the base stations may be in the form of nodes. Each node may include a base transceiver system (BTS) that communicates via an antennae system over an air-link with one or more user devices that are within range. The BTS may send radio communication signals to user devices and receive radio communication signals from user devices. The RANs may carry the communications of the user devices between the respective base stations and a core network of the wireless communication carrier 102. The core network may connect to a public packet data communication network, such as the Internet. Data and voice communications via the RANs, the core network, and the Internet may support a variety of telecommunication services through the wireless communication carrier 102.

In various embodiments, 2G and/or 3G network components of the wireless communication carrier 102 may include a serving GPRS support node (SGSN) that routes voice calls to and from the public switched telephone network (PSTN), a Gateway GPRS Support Node (GGSN) that handles the routing of data communication between external packet switched networks and the core network. The network components may further include a Packet Data Network (PDN) gateway (PGW) that routes data traffic between the GGSN and the Internet. The LTE components of the wireless communication carrier 102 may include an Evolved Packet Core (EPC) and an IP multimedia Subsystem (IMS) core.

The wireless communication carrier 102 may provide telecommunication services to multiple user devices, such as the user device 104. In various embodiments, the user devices may include a smartphone, a tablet computer, a smartwatch, an embedded computer system, or any other device that is capable of obtain telecommunication and/or data communication services from the wireless communication carrier 102. The user device 104 may be equipped with an eUICC 106, i.e., an integrated circuit chip that is directly wired or soldered to a circuit board of the user device. The eUICC 106 may store one or more eSIM profiles, such as the eSIM profile 108. Each eSIM profile may include information for accessing telecommunication services provided by a corresponding wireless communication carrier, such as the wireless communication carrier 102. Such information may include an Integrated Circuit Card identifier (ICCID) that identifies the eSIM profile, an eUICC ID (EID) of the eUICC, an international mobile subscriber identity (IMSI) number, security authentication information, an operator profile that enables the eUICC to authenticate with the wireless communication network, and/or so forth. The user device 104 may be further equipped with a modem that enables the user device 104 to perform telecommunication and data communication with the wireless communication carrier 102. Accordingly, the modem may encode digital information for transmission in uplink radio signals to the wireless communication carrier 102, as well as decode digital information that are received from the wireless communication carrier 102 via downlink radio signals.

The user device 104 may receive eSIM profiles for storage on the eUICC 106 via over-the-air (OTA) updates from wireless communication carriers. For example, a subscription management service 110 of the wireless communication carrier 102 may send one or more data packets that contain an eSIM profile 108 to the modem of the user device 104 via downlink communication. The data packets are assembled by the software of the modem into the eSIM profile 108 and sent to the eUICC 106 for installation in the eUICC 106.

The core network of the wireless communication carrier 102 may provide subscription management service 110 for managing of eSIM profiles that are installed in the eUICCs of subscriber user devices. In various embodiments, the subscription management service 110 may be provided by one or more subscription managers, such as a Subscription Manager Data Preparation Plus (SM-DP+), and a Subscription Manager Secure Routing (SM-SR). The SM-DP+ is a service that configures an eSIM profile for OTA delivery to an eUICC, and the SM-SR is a service that securely delivers the eSIM profile to the eUICC, among other services. In various embodiments, the subscription management service 110 may be hosted at a data center of the wireless communication network 102 or hosted at a third-party data center for the benefit of the wireless communication network 102. For example, an eSIM profile vendor may host the subscription management service 110 in its data center.

Additionally, the subscription management service 110 may be equipped with an eSIM profile store 112 that stores eSIM profiles managed by the wireless communication carrier 102, including duplicates of eSIM profiles that are already installed on eUICCs of subscriber user devices, and eSIM profiles that are available for installation on eUICCs. Each of the eSIM profile in the eSIM profile store 112 may have associated profile state data that tracks the profile state of the eSIM profile. For example, when an eSIM profile is provisioned to an eUICC for use, the SM-DP+ may store the profile state of the eSIM profile as in use. In some embodiments, the profile state data of eSIM profiles may be maintained in a profile state data store by the SM-DP+.

The core network may further include a billing function 114. The billing function 114 may enable the wireless communication carrier 102 to monitor the telecommunication services, such as data, voice, text, etc., that are used by each subscriber, and charge the subscribers based on service usage. In various embodiments, the billing function 114 may be provided by a business support system (BSS) or one or more equivalent core network components of the wireless communication carrier 102.

In operation, the SM-DP+ of the wireless communication carrier 102 may receive a notification from the user device 104 indicating that the eSIM profile 108 is deleted from the eUICC 106. The notification may be sent by the user device 104 to the wireless communication carrier 102 via a communication link 116 between the device and the carrier. In turn, the SM-DP+ may change a profile state of the eSIM profile 108 from in use to suspended instead of deleted. In some instances, the SM-DP+ may include a garbage collection function that periodically deletes from the eSIM profile store 112 eSIM profiles with deleted profile states. Thus, by changing the profile state of the eSIM profile 108 from in use to suspended, instead of a profile state of deleted upon the notification from the user device, the SM-DP+ may prevent the garbage collection function from prematurely purging the eSIM profile 108 from the eSIM profile store 112. In other words, the profile state of suspended indicates that an eSIM profile is not currently deployed for use on an eUICC, but the eSIM profile is also not to be purged from the eSIM profile data store 112.

Subsequently, the SM-DP+ may inform the billing function 114 of the deletion notification regarding the eSIM profile 108 and the change to the profile state of the profile. In some embodiments, the SM-DP+ may interact with the billing function 114 by calling one or more application program interfaces (APIs) 118 of the billing function 114. For example, the notification may identify the eSIM profile 108 that is deleted by an ICCID of the eSIM profile. In turn, the billing function 114 may run a business logic to determine whether a billing status 120 of the eSIM profile 108 is active or inactive with the billing function 114 for billing a subscriber that is associated with the eSIM profile 108. For example, the billing function 114 may query for corresponding subscriber account information in a subscriber account information database using the ICCID of the eSIM profile 108. The billing status 120 of the eSIM profile 108 may be an active status 122 when the corresponding subscriber associated with the eSIM profile 108 is enrolled to receive telecommunication services from the wireless communication carrier 102. In contrast, the billing status 120 of the eSIM profile 108 may an inactive status 124 when the obligation of the wireless communication carrier 102 to provide telecommunication services to the subscriber associated with the eSIM profile 108 has terminated. For example, the obligation to provide telecommunication services may have been terminated due to a service contracted ending, a user device being ported out to a different wireless communication carrier, a failure to pay for telecommunication services, and/or so forth.

Thus, if the eSIM profile 108 is determined to have the active status 122 with the billing function 114, the billing function 114 may deem the eSIM profile 108 as capable of being reused by the same eUICC, i.e., an eUICC with an identical EID to the specific EID of the eUICC from which the eSIM profile 108 was originally notified as deleted. Accordingly, the billing function 114 may request that the SM-DP+ transition the profile state of the eSIM profile 108 to released by the eUICC, meaning that the eSIM profile 108 is released for reuse solely by the eUICC with the specific EID. However, if the eSIM profile 108 is determined by the business logic of the billing function 114 to have the inactive status 124, the billing function 114 may deem the eSIM profile 108 as being reusable by any eUICC. Accordingly, the billing function 114 may request that the SM-DP+ transition the profile state of the eSIM profile 108 to available for reuse by any eUICC.

In turn, the SM-DP+ may receive the profile state transition request from the billing function 114. For example, the SM-DP+ may receive the profile state transition request via the API 118 or one or more APIs 126 of the SM-DP+ that is called by the billing function 114. In some embodiments, the APIs may be configured to take a single value (such as a single ICCID for an eSIM profile) for the purpose of processing eSIM profile state transition. In other embodiments, the APIs may be configured to take multiple values or a range of values to accommodate bulk eSIM profile state transition updates. Accordingly, the SM-DP+ may transition the profile state of the eSIM profile 108 to the requested profile state.

Thus, at this point, the eSIM profile may have a profile state 128 of released or available, depending on the request received. The eSIM profile 108 is then placed by the SM-DP+ in the eSIM profile store 112 with a pool with other unassigned eSIM profiles, such as eSIM profiles 130(1)-130(N), ready for assignment. In some embodiments, the SM-DP+ may perform an additional check in response to receiving a profile state transition request from the billing function 114 for an eSIM profile and prior to making a profile state transition for the eSIM profile. The additional check involves verifying that a deletion notification for the eSIM profile has been previously received from a corresponding user device. For example, the eSIM profile deletion notifications that are received from the user devices may be stored in a deletion notification data store by the SM-DP+. Accordingly, the SM-DP+ may check such a data store to ensure that a deletion notification for a particular eSIM profile has been previously received prior to fulfilling a profile state transition request from the billing function 114. Such verification may help to prevent the possibility of eSIM profile cloning.

Subsequently, the SM-DP+ may receive a request to provision the eUICC 106 of the user device 104 with a new eSIM profile. For example, the request may be initiated by an input from an administrator or the billing function 114 in response to a report from a subscriber that an existing eSIM profile on the eUICC 106 has been accidentally deleted. In another example, the request may be initiated by an order management component of the BSS of the wireless communication carrier 102 in response to a contract commencement of new telecommunication services for the user device 104. In response, the SM-DP+ may use the EID of the eUICC 106 to search the available pool of eSIM profiles for an eSIM profile whose profile status indicates that the eSIM profile is released for reuse solely by an eUICC with the EID. In a scenario in which the deletion of the eSIM profile 108 was accidental, the SM-DP+ may locate such an eSIM profile, i.e., the eSIM profile 108, and initiate the provision of the eSIM profile to the eUICC 106. Accordingly, the new eSIM profile 132 that is provisioned to the eUICC 106 in response to the request is in fact a duplicate of the previously provisioned eSIM profile 108. However, in a scenario in which the deletion of the eSIM profile 108 was not accidental, the SM-DP+ may be unable to locate an eSIM profile with a profile state of released for reuse solely by the eUICC 106 using the query. As such, the SM-DP+ may initiate the provision of a different unassigned eSIM profile, such as the eSIM profile 130(1), as the new eSIM profile 132 to the eUICC 106. In various embodiments, the provisioning of an unassigned eSIM profile may involve associating the IMSI of the eSIM profile with a subscriber account of the subscriber that is affiliated with the user device 104. In this way, the eSIM profile is bound to the eUICC 106. The subscription management service 110 of the core network may use the communication link 116 to send the new eSIM profile 132 to the eUICC 106 of the user device 104.

In some embodiments, the billing function 114 may be configured to independently initiate a profile state transition for an eSIM profile, such as the eSIM profile 108. In such embodiments, the billing function 114 may receive an indication that the eSIM profile is no longer active for billing a corresponding subscriber. Such an indication may be received from the BSS of the wireless communication carrier 102 in response to a suspension or a termination of the subscriber account, service contract, etc., of the subscriber. In the event there was a communication disruption between the SM-DP+ and the billing function 114, the billing function 114 may receive such an indication without ever being informed that the eSIM profile is deleted from an eUICC by the SM-DP+.

In response, the billing function 114 may send a query to the SM-DP+ for a profile state of the eSIM profile. For example, the billing function 114 may send such a query by calling one or more APIs of the SM-DP+. The SM-DP+ may return the profile state of the eSIM profile to the billing function 114. If the returned profile state of the eSIM profile is suspended, the billing function 114 may proceed with a request to change the profile state of the eSIM profile to released by the eUICC, meaning that the eSIM profile is released for reuse solely by the eUICC. However, if the returned profile state of the eSIM profile is anything other than suspended, the billing function 114 may refrain from making the request as there is a high probability that the eSIM profile may not have been deleted from the eUICC.

Example Computing Device Components

Figure 2:
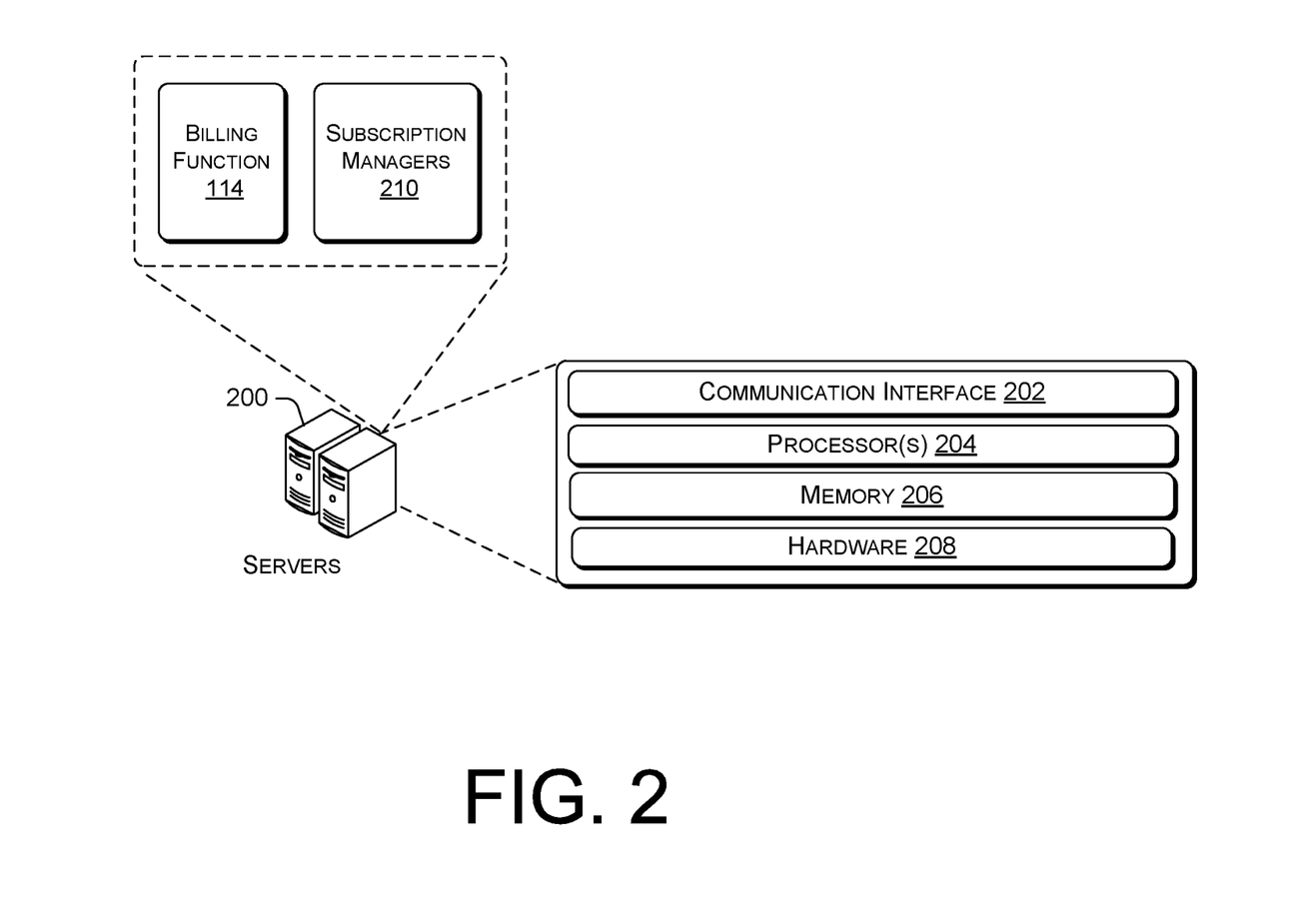
FIG. 2 is a block diagram showing various components of one or more illustrative computing devices that support the implementation of eSIM profile reuse by a wireless communication carrier.

FIG. 2 is a block diagram showing various components of one or more illustrative computing devices that support the implementation of eSIM profile reuse by a wireless communication carrier. The computing devices 200 may include a communication interface 202, one or more processors 204, memory 206, and hardware 208. The communication interface 202 may include wireless and/or wired communication components that enable the computing devices 200 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In other embodiments, the computing devices 200 or components thereof may be virtual computing devices in the form of virtual machines or software containers that are hosted in a computing cloud.

The computing devices 200 may implement various back-end services and components of the wireless communication carrier 102, such as the billing function 114 and subscription managers 210 that provide the subscription management service 110. The implementation involves the execution of software, applications, and/or modules that include routines, program instructions, code segments, objects, and/or data structures that perform particular tasks or implement particular abstract data types.

Example Processes

Figure 3:
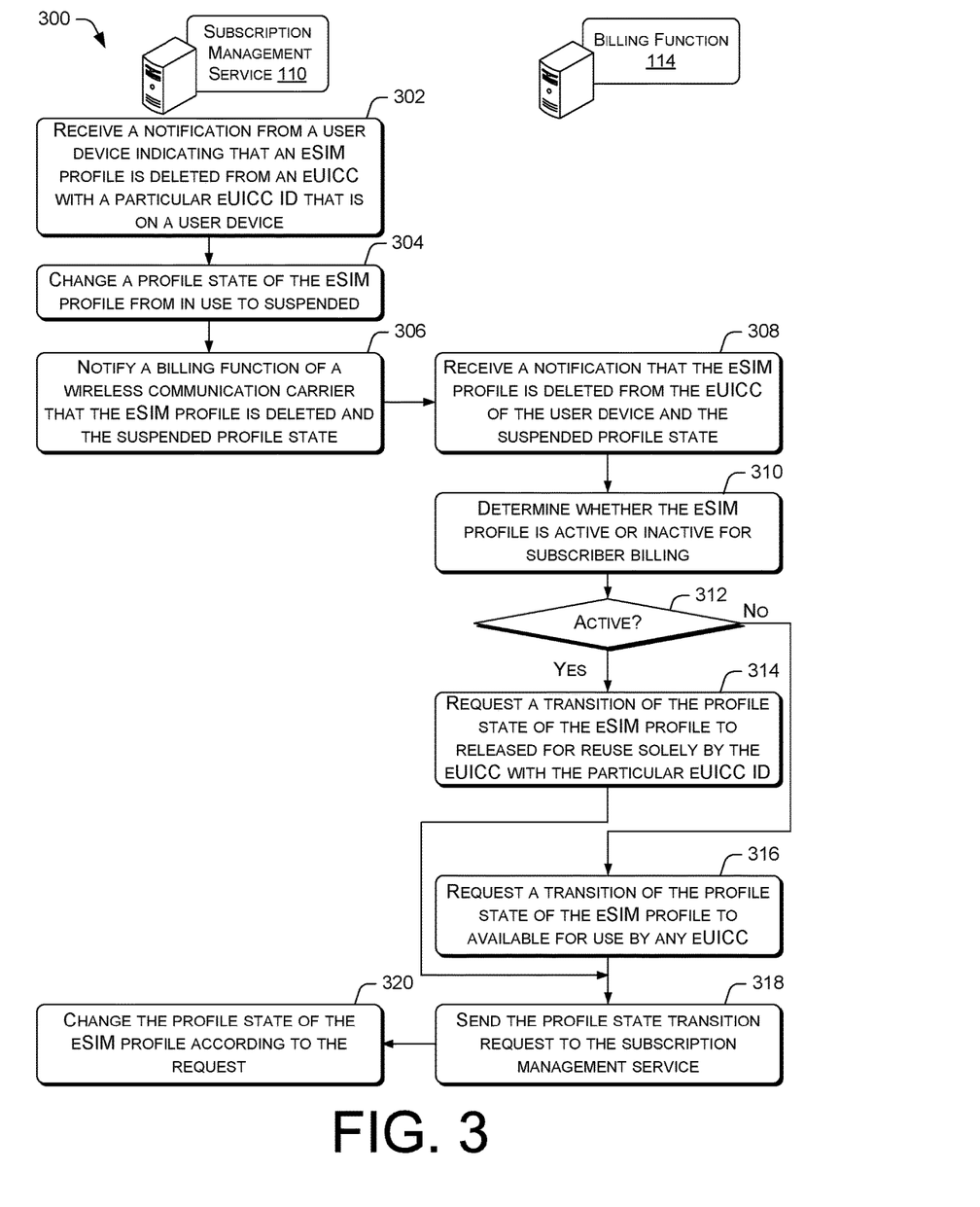
FIG. 3 is a flow diagram of an example process for changing the profile state of an eSIM profile that is deleted from an eUICC in order to reuse the eSIM profile.
Figure 4:
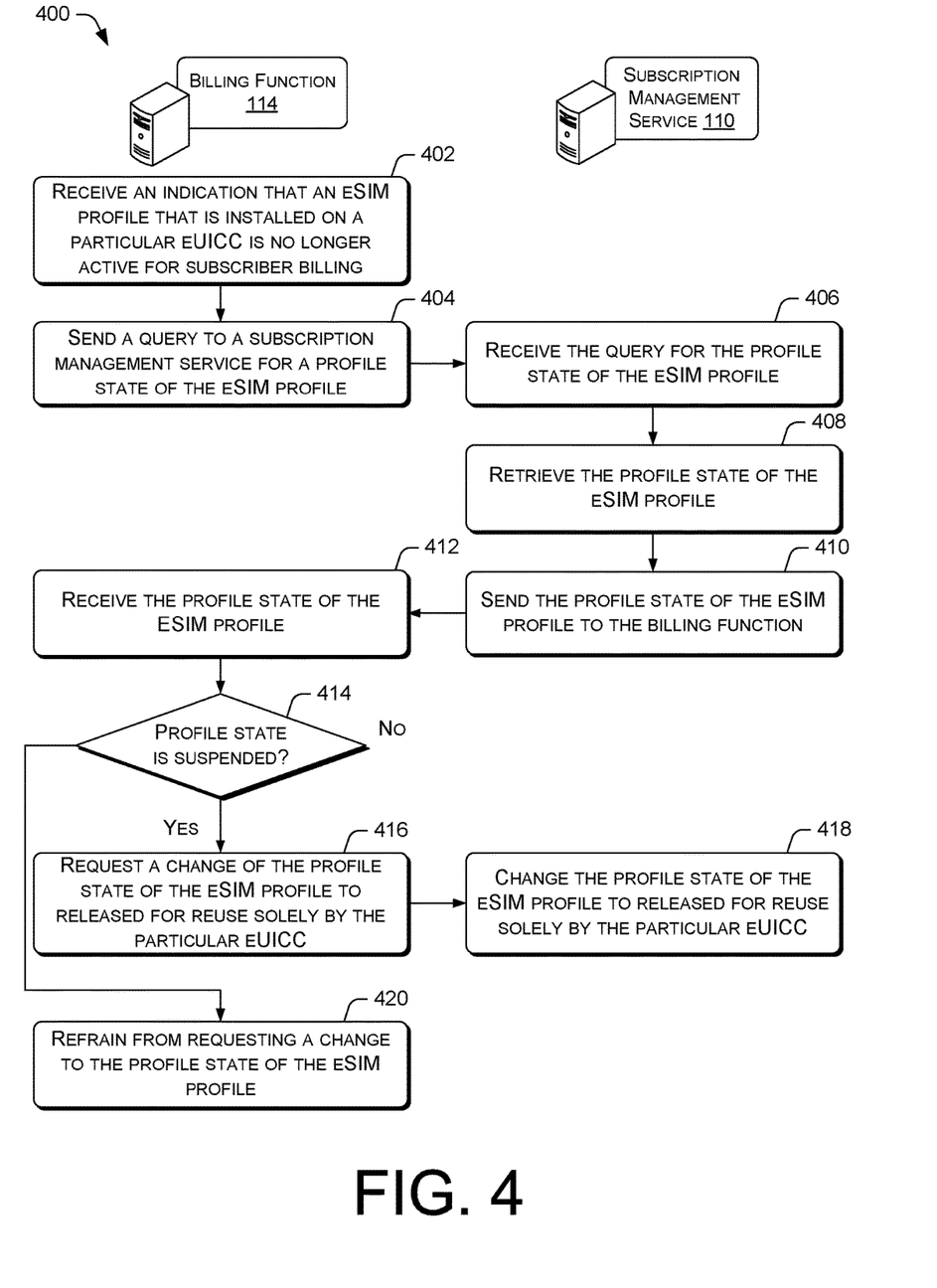
FIG. 4 is a flow diagram of an example process for a billing function of a wireless communication carrier to verify the profile state of an eSIM profile for determining whether to modify the profile.
Figure 5:
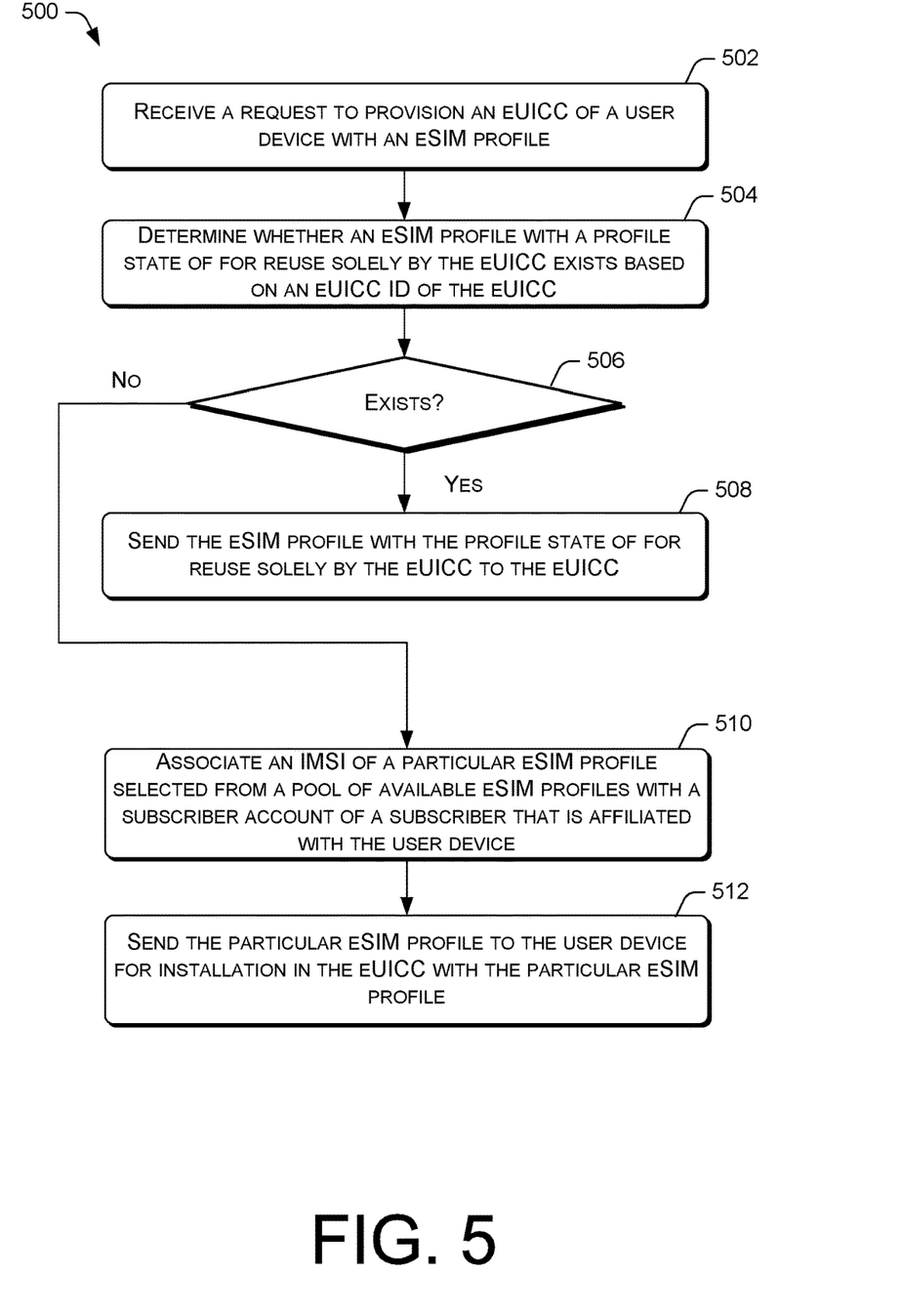
FIG. 5 is a flow diagram of an example process for provisioning the eUICC of a user device with a reused or new eSIM profile.

FIGS. 3-5 present illustrative processes 300-500 for a wireless communication carrier to implement the reuse of eSIM profiles that are deleted from corresponding eUICCs. Each of the processes 300-500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-500 are described with reference to the architecture 100 of FIG. 1.

FIG. 3 is a flow diagram of an example process 300 for changing the profile state of an eSIM profile that is deleted from an eUICC in order to reuse the eSIM profile. At block 302, the subscription management service 110 of the wireless communication carrier 102 may receive a notification from a user device indicating that an eSIM profile is deleted from an eUICC on a user device. The deletion notification may identify the eUICC by a particular eUICC ID (EID). In various embodiments, the subscription management service 110 may be provided by one or more subscription managers, such as a Subscription Manager Data Preparation Plus (SM-DP+), and a Subscription Manager Secure Routing (SM-SR). At block 304, the subscription management service 110 may change a profile state of the eSIM profile from a profile state of in use to a profile state of suspended. In various embodiments, the profile state of the eSIM is tracked via profile state data that is associated with the eSIM profile.

At block 306, the subscription management service 110 may notify a billing function 114 of the wireless communication carrier 102 that the eSIM profile is deleted from the eUICC. The notification may further include the suspended profile state of the eSIM profile. In some embodiments, the SM-DP+ may interact with the billing function 114 via one or more APIs. For example, the notification sent by the subscription management service 110 may identify the eSIM profile that is deleted by an ICCID of the profile.

At block 308, the billing function 114 may receive the notification that the eSIM profile is deleted from the eUICC of the user device. The notification may further include the suspended profile state of the eSIM profile. At block 310, the billing function 114 may determine whether the eSIM profile is active or inactive for billing a subscriber that is associated with the eSIM profile. For example, the billing function 114 may query for corresponding subscriber account information in a subscriber account information database using the ICCID of the eSIM profile to obtain the billing status of the eSIM profile.

At decision block 312, if the billing function 114 determines that the eSIM profile is active for billing the subscriber ("yes" at decision block 312), the process 300 may proceed to block 314. At block 314, the billing function 114 may request a transition of the profile state of the eSIM profile to a profile state of released for reuse solely by the eUICC with the particular EID. However, if the billing function 114 determines at decision block 312 that the eSIM profile is inactive for billing the subscriber ("no" at decision block 312), the process 300 may proceed to block 316. At block 316, the billing function 114 may request a transition of the profile state of the eSIM profile to available for use by any eUICC. At block 318, the billing function 114 may send the profile state transition request to the subscription management service 110 via one or more APIs. At block 320, the subscription management service 110 may change the profile state of the eSIM profile as stored in the eSIM profile store 112 according to the request.

FIG. 4 is a flow diagram of an example process 400 for a billing function of a wireless communication carrier to verify the profile state of an eSIM profile for determining whether to modify the profile. At block 402, the billing function 114 of the wireless communication carrier 102 may receive an indication that an eSIM profile is no longer active for subscriber billing. The eSIM profile is installed on a particular eUICC with a specific EID. In various embodiments, the billing function 114 may receive such an indication in response to a suspension or a termination of the subscriber account, service contract, etc., of the subscriber. At block 404, the billing function 114 may send a query to a subscription management service 110 for a profile state of the eSIM profile. At block 406, the subscription management service 110 may receive the query for the profile state of the eSIM profile. In various embodiments, the billing function 114 may communicate the query to the subscription management service 110 via one or more APIs.

At block 408, the subscription management service 110 may retrieve the profile state of the eSIM profile. In various embodiments, the profile state of the eSIM profile is retrieved from the relevant profile state data associated with the eSIM profile. At block 410, the subscription management service 110 may send the profile state of the eSIM profile to the billing function 114. At block 412, the billing function 114 may receive the profile state of the eSIM profile.

At decision block 414, the billing function 114 may determine whether the profile state of the eSIM profile as received from the billing function 114 indicates that the eSIM profile is in a suspended profile state. Thus, if the eSIM profile is in a suspended profile state ("yes" at decision block 414), the process 400 may proceed to block 416. At block 416, the billing function 114 may send a request to the subscription management service 110 for a change of the profile state of the eSIM profile to released for reuse solely by the particular eUICC. At block 418, the subscription management service 110 may change the profile state of the eSIM profile to released for reuse solely by the particular eUICC.

Returning to decision block 414, if the billing function 114 determines that the eSIM profile is not in a suspended state ("no" at decision block 414), the process 400 may proceed to block 420. At block 420, the billing function 114 may refrain from requesting a change to the profile state of the eSIM profile.

FIG. 5 is a flow diagram of an example process 500 for provisioning the eUICC of a user device with a reused or new eSIM profile. At block 502, the subscription management service 110 of the wireless communication carrier 102 may receive a request to provision an eUICC of a user device with an eSIM profile. In various embodiments, the request may be initiated by an input from an administrator or the billing function 114 in response to a report from a subscriber that an existing SIM profile on the eUICC has been accidentally deleted, or in response to the initiation of a new telecommunication services for the user device 104.

At block 504, the subscription management service 110 may determine whether an eSIM profile with a profile state of released for reuse solely by the eUICC 106 exists in an available pool of eSIM profiles stored in the eSIM profile store 112 based on an EID of the eUICC. In various embodiments, a query is performed on the available pool to search for an eSIM profile with the EID and the particular profile state. At decision block 506, if the subscription management service 110 determines that such an eSIM profile exists ("yes" at decision block 506), the process 500 may proceed to block 508. At block 508, the subscription management service 110 may send the eSIM profile with the state of released for reuse solely by the eUICC 106 to the eUICC 106. However, if the subscription management service 110 determines that such an eSIM profile does not exist ("no" at decision block 506), the process 500 may proceed to block 510. At block 510, the subscription management service 110 may associate an IMSI of a particular eSIM profile selected from the pool of available eSIM profiles with a subscriber account of the subscriber that is affiliated with the user device 104. At block 512, the subscription management service 110 may send the particular eSIM profile to the user device 104 for installation in the eUICC 106 with the particular eSIM profile.

The reuse of eSIM profiles by a wireless communication carrier may reduce or eliminate the cost and the administrative burden of purchasing new eSIM profiles to replace eSIM profiles that are accidentally deleted from the eUICC of user devices. Further, eSIM profiles that are deleted from eUICCs in response to legitimate telecommunication service terminations (e.g., ending a service contract with a carrier, porting a user device to another carrier, etc.) may be recycled for reused by other eUICCs. Such reuse may once again provide savings to the wireless communication carrier by reducing the need to purchase new eSIM profiles from eSIM profile venders. Additionally, since the pool of available unassigned IMSIs are not infinite, the reuse of eSIM profiles prevents unnecessary waste of IMSIs due to the deletion of corresponding eSIM profiles.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving, at a subscription management service of a wireless communication carrier, a notification from a user device indicating that an embedded subscriber identity module (eSIM) profile is deleted from an embedded universal integrated circuit card (eUICC) of the user device, the eUICC having a particular eUICC identifier (ID);
   transitioning a profile state of the eSIM profile that is stored in a profile state data store of the subscription management service from a state of in use to a state of suspended;
   sending a notification from the subscription management service to notifying a billing function of the wireless communication carrier indicating that the eSIM profile is deleted from the eUICC of the user device and the profile state of the eSIM profile is suspended;
   transitioning, via the subscription management service, the profile state of the eSIM profile that is deleted from the eUICC of the user device following the billing function determining that the eSIM profile is active for billing a subscriber associated with the eSIM profile for telecommunication services provided by the wireless communication carrier, the profile state of the eSIM profile being transitioned from suspended to released for reuse solely by the eUICC with the particular eUICC ID; and
   transitioning, via the subscription management service, the profile state of the eSIM profile that is deleted from the eUICC of the user device from suspended to available for use by any eUICC following the billing function determining that the eSIM profile is inactive for billing the subscriber associated with the eSIM profile for the telecommunication services provided by the wireless communication carrier.

2. The one or more non-transitory computer-readable media of claim 1, wherein the acts further comprise placing a duplicate of the eSIM profile with the profile state of released for reuse solely by the eUICC with the particular eUICC ID or the profile state of available for use by any eUICC in a pool of eSIM profiles that are available for assignment to eUICCs, the pool of eSIM profiles being maintained by the wireless communication carrier.

3. The one or more non-transitory computer-readable media of claim 1, wherein the transitioning the profile state of the eSIM profile from the state of in use to the state of suspended prevents a garbage collection function of the wireless communication carrier from deleting a duplicate of the eSIM profile from an eSIM profile store of the wireless communication carrier.

4. The one or more non-transitory computer-readable media of claim 1, where the acts further comprise:
   receiving a request to provision the eUICC of the user device with a replacement eSIM profile, the request including an eUICC ID of the eUICC;
   querying a pool of eSIM profiles that are available for assignment to eUICCs that is maintained by the wireless communication carrier for an available eSIM profile with the profile state of released for reuse solely by the eUICC based on the eUICC ID of the eUICC; and
   sending the available eSIM profile with the profile state of released for reuse solely by the eUICC to the eUICC of the user device for installation in the eUICC in response to determining that the available eSIM profile is located in the pool of eSIM profiles.

5. The one or more non-transitory computer-readable media of claim 4, wherein the acts further comprise, in response to determining that no eSIM profile with the profile state of released for reuse solely by the eUICC exists in the pool of eSIM profiles:
   associating an IMSI of a particular eSIM profile selected from the pool of eSIM profiles with a subscriber account of the subscriber that is affiliated with the user device; and
   sending the particular eSIM profile to the user device for installation in the eUICC.

6. The one or more non-transitory computer-readable media of claim 1, wherein the receiving the notification from the user device includes receiving the notification following an accidental deletion of the eSIM profile from the eUICC of the user device or a termination of a contract of the subscriber for telecommunication services from the wireless communication carrier.

7. The one or more non-transitory computer-readable media of claim 1, wherein eUICC stores information that includes an Integrated Circuit Card identifier (ICCID) that identifies the eSIM profile and an operator profile that enables the eUICC to authenticate with the wireless communication carrier.

8. The one or more non-transitory computer-readable media of claim 1, wherein the sending the notification includes sending an ICCID to the billing function of the wireless communication carrier such that the ICCID is used by the billing function to identify whether the eSIM profile is active or inactive for billing the subscriber associated with the eSIM profile for telecommunication service.

9. A computer-implemented method, comprising:
receiving, at a subscription management service of a wireless communication carrier, a notification from a user device indicating that an embedded subscriber identity module (eSIM) profile is deleted from an embedded universal integrated circuit card (eUICC) of the user device, the eUICC having a particular eUICC identifier (ID);
transitioning, via the subscription management service, a profile state of the eSIM profile that is stored in a profile state data store of the subscription management service from a state of in use to a state of suspended;
sending a notification from the subscription management service to a billing function of the wireless communication carrier indicating that the eSIM profile is deleted from the eUICC of the user device and the profile state of the eSIM profile is suspended;
receiving, at the subscription management service, a first request from the billing function to transition the profile state of the eSIM profile that is deleted from the eUICC of the user device to a first transitioned profile state of released for reuse solely by the eUICC with the particular eUICC ID in response to the billing function determining that the eSIM profile is active for billing a subscriber associated with the eSIM profile for telecommunication services provided by the wireless communication carrier, or receiving, at the subscription management service, a second request from the billing function to transition the profile state of the eSIM profile that is deleted from the eUICC of the user device to a second transitioned profile state of available for use by any eUICC following the billing function determining that the eSIM profile is inactive for billing the subscriber associated with the eSIM profile for the telecommunication services provided by the wireless communication carrier; and
transitioning, at the subscription management service, the profile state of the eSIM profile from suspended to the first transitioned profile state or the second transitioned profile state.

10. The computer-implemented method of claim 9, further comprise placing a duplicate of the eSIM profile with the first transitioned profile state or the second transitioned profile state in a pool of eSIM profiles that are available for assignment to eUICCs, the pool of eSIM profiles being maintained by the wireless communication carrier.

11. The computer-implemented method of claim 9, wherein the transitioning the profile state of the eSIM profile from the state of in use to the state of suspended prevents a garbage collection function of the wireless communication carrier from deleting a duplicate of the eSIM profile from an eSIM profile store of the wireless communication carrier.

12. The computer-implemented method of claim 9, further comprising:
receiving, at the subscription management service, a request to provision the eUICC of the user device with a replacement eSIM profile, the request including an eUICC ID of the eUICC;
querying, via the subscription management service, a pool of eSIM profiles that are available for assignment to eUICCs that is maintained by the wireless communication carrier for an available eSIM profile with the profile state of released for reuse solely by the eUICC based on the eUICC ID of the eUICC; and
sending, via the subscription management service, the available eSIM profile with the profile state of released for reuse solely by the eUICC to the eUICC of the user device for installation in the eUICC in response to determining that the available eSIM profile is located in the pool of eSIM profiles.

13. The computer-implemented method of claim 12, further comprising, in response to determining that no eSIM profile with the profile state of released for reuse solely by the eUICC exists in the pool of eSIM profiles:
associating an IMSI of a particular eSIM profile selected from the pool of eSIM profiles with a subscriber account of the subscriber that is affiliated with the user device; and
sending the particular eSIM profile to the user device for installation in the eUICC.

14. The computer-implemented method of claim 9, wherein the receiving the notification from the user device includes receiving the notification following an accidental deletion of the eSIM profile from the eUICC of the user device or a termination of a contract of the subscriber for telecommunication services from the wireless communication carrier.

15. The computer-implemented method of claim 9, wherein the subscription management service is provided by one or more subscription managers that execute on one or more computing devices, the one or more subscription managers including at least one of a Subscription Manager Data Preparation Plus (SM-DP+) or a Subscription Manager Secure Routing (SM-SR).

16. The computer-implemented method of claim 9, wherein the sending the notification, the receiving the first request, or the receiving the second request are performed via one or more APIs of the subscription management service or the billing function.

17. The computer-implemented method of claim 9, wherein the receiving the first request or the second request includes receiving an ICCID of the eSIM profile via an API of the subscription management service such that the subscription management service transitions the profile state of the eSIM profile as identified by the ICCID.

18. A system, comprising:
one or more processors; and
memory including a plurality of computer-executable components that are executable by the one or more processors to perform a plurality of actions, the plurality of actions comprising:
receiving, at a billing function of a wireless communication carrier, an indication that an embedded subscriber identity module (eSIM) profile that is installed on a particular embedded universal integrated circuit card (eUICC) of a user device is no longer active for billing a subscriber associated with the eSIM profile for telecommunication services provided by the wireless communication carrier;
sending a query from the billing function of the wireless communication carrier to a subscription management service of the wireless communication carrier for a profile state of the eSIM profile;
sending from the billing function of the wireless communication carrier to the subscription management service of the wireless communication carrier a request to transition the profile state of the eSIM profile to released for reuse solely by the particular eUICC in response to the subscription management service indicating that the eSIM profile is in a suspended profile state; and refraining from requesting by the billing function of the wireless communication carrier a change to the profile state of the eSIM profile in response to the subscription management service of the wireless communication carrier indicating that the eSIM profile is not in a suspended profile state.

19. The system of claim 18, wherein the eSIM profile is transitioned from an in use profile state to the suspended profile state following a deletion of the eSIM profile from the particular eUICC.

20. The system of claim 18, wherein the suspended profile state prevents a garbage collection function of the wireless communication carrier from deleting a duplicate of the eSIM profile from an eSIM profile store of the wireless communication carrier.

* * * * *